(12) United States Patent
Shyu et al.

(10) Patent No.: US 12,277,693 B2
(45) Date of Patent: Apr. 15, 2025

(54) EVALUATING VISUAL QUALITY OF DIGITAL CONTENT

(71) Applicant: GOOGLE LLC, Mountain View, CA (US)

(72) Inventors: Catherine Shyu, Mountain View, CA (US); Xiyang Luo, Mountain View, CA (US); Feng Yang, Sunnyvale, CA (US); Junjie Ke, East Palo Alto, CA (US); Yicong Tian, Mountain View, CA (US); Chao-Hung Chen, Milpitas, CA (US); Xia Li, Sunnyvale, CA (US); Luying Li, Sunnyvale, CA (US); Wenjing Kang, Santa Clara, CA (US); Shun-Chuan Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 541 days.

(21) Appl. No.: 17/612,372

(22) PCT Filed: Aug. 6, 2020

(86) PCT No.: PCT/US2020/045230
§ 371 (c)(1),
(2) Date: Nov. 18, 2021

(87) PCT Pub. No.: WO2022/031288
PCT Pub. Date: Feb. 10, 2022

(65) Prior Publication Data
US 2022/0301141 A1    Sep. 22, 2022

(51) Int. Cl.
*G06V 10/82*    (2022.01)
*G06T 7/00*    (2017.01)

(52) U.S. Cl.
CPC ............ *G06T 7/0002* (2013.01); *G06V 10/82* (2022.01); *G06T 2200/24* (2013.01);
(Continued)

(58) Field of Classification Search
CPC .............. G06T 7/0002; G06T 2200/24; G06T 2207/20081; G06T 2207/20084; G06T 2207/30168; G06V 10/82
(Continued)

(56) References Cited

U.S. PATENT DOCUMENTS 10,013,639 B1    7/2018    Schurman et al.
2012/0269441 A1*  10/2012    Marchesotti .......... G06F 18/253
                                                  382/195
2020/0069292 A1    3/2020    Abolmaesumi et al.

FOREIGN PATENT DOCUMENTS

CN    110520871    11/2019
JP    2008-083892    4/2008
(Continued)

OTHER PUBLICATIONS

Office Action in Japanese Appln. No. 2021-572915, dated Dec. 5, 2022, 7 pages (with English translation).
(Continued)

*Primary Examiner* — Stephen P Coleman
(74) *Attorney, Agent, or Firm* — Fish & Richardson P.C.

(57) ABSTRACT

Systems, devices, methods, and computer readable medium for evaluating visual quality of digital content are disclosed. Methods can include training machine learning models on images. A request is received to evaluate quality of an image included in a current version of a digital component generated by the computing device. The machine learning models are deployed on the image to generate a score for each quality characteristic of the image. A weight is assigned to each score to generate weighted scores. The weighted scores are combined to generate a combined score for the image. The combined score is compared to one or more thresholds to generate a quality of the image.

20 Claims, 8 Drawing Sheets

(52) U.S. Cl.
CPC ............... *G06T 2207/20081* (2013.01); *G06T 2207/20084* (2013.01); *G06T 2207/30168* (2013.01)

(58) Field of Classification Search
USPC .......................................................... 382/156
See application file for complete search history.

(56) References Cited

FOREIGN PATENT DOCUMENTS

| | | |
|---|---|---|
| JP | 2011-199740 | 10/2011 |
| JP | 2020-087118 | 6/2020 |

OTHER PUBLICATIONS

Notice of Allowance in Japanese Appln. No. 2021-572915, dated Apr. 24, 2023, 5 pages (with English translation).
Office Action in Indian Appln. No. 202127051762, dated Mar. 27, 2023, 8 pages (with English translation).
International Preliminary Report on Patentability in International Appln. No. PCT/US2020/045230, mailed on Feb. 16, 2023, 8 pages.
International Search Report and Written Opinion in International Appln. No. PCT/US2020/045230, dated Apr. 6, 2021, 13 pages.
Office Action in European Appln. No. 20761663.2, mailed on Dec. 20, 2023, 7 pages.
Office Action in Chinese Appln. No. 202080041645.3, mailed on Sep. 24, 2024, 19 pages (with English translation).

\* cited by examiner

EVALUATING VISUAL QUALITY OF DIGITAL CONTENT

CROSS-REFERENCE TO RELATED APPLICATION

This application is a National Stage Application under 35 U.S.C. § 371 and claims the benefit of International Application No. PCT/US2020/045230, filed Aug. 6, 2020. The disclosure of the foregoing application is hereby incorporated by reference in its entirety.

TECHNICAL FIELD

This specification relates generally to data processing, and more specifically to digital content evaluation.

BACKGROUND

A computing device may create digital components, and distribute them to various client devices. The digital components may be formed of content assets, such as images, text, and the like, which are collectively combined to form the digital components. In some situations, even if a single content asset used to form a digital component has a poor quality—e.g. an image is blurry, includes objectionable content (e.g. sexually explicit content), has an orientation that does not conform to the area on which the digital component is to be displayed, or the like—the quality of the resulting digital component can be negatively impacted.

SUMMARY

In general, one innovative aspect of the subject matter described in this specification can be embodied in methods including the operations of training, by a content distribution system comprising one or more processors, a plurality of machine learning models on a plurality of images, each image being assigned scores indicating quality characteristics of the image, each machine learning model being trained to score an image for a respective quality characteristic; receiving, by the content distribution system from a computing device, a request to evaluate quality of an image included in a current version of a digital component generated by the computing device; deploying, by the content distribution system, the plurality of machine learning models on the image to generate a score for each quality characteristic; assigning, by the content distribution system, a weight to each score to generate weighted scores; combining, by the content distribution system, the weighted scores to generate a combined score for the image; and comparing, by the content distribution system, the combined score to one or more thresholds to generate a quality of the image. Other embodiments of this aspect include corresponding methods, apparatus, and computer programs, configured to perform the actions of the methods, encoded on computer storage devices.

These and other embodiments can each optionally include one or more of the following features. The plurality of machine learning models can include two or more of a blurriness model, an objectionable content model, or an orientation model. The blurriness model can generate a blurriness score quantifying blurriness within the image. The objectionable content model can generate an objectionable content score quantifying objectionable content within the image. The orientation model can generate an orientation score indicating an orientation of the image.

The one or more machine learning models can include a neural network model including a plurality of nodes and a plurality of layers. At least one of a number of the nodes or a number of the layers can be varied as the training of the neural network progresses so as to experimentally determine an ideal number of at least one of the nodes or the layers.

Methods can include aggregating, by the content distribution system, the combined score with other combined scores of other images in the digital component to generate an aggregate score for the digital component; and Methods can include updating, by the one or more processors, a graphical user interface of a first computing device to present the aggregate score.

Methods can include receiving, by the one or more processors, a modification of the image; evaluating, by the one or more processors, the combined score for the modified image; modifying, by the one or more processors, the aggregate score based on the combined score; and updating, by the one or more processors, the graphical user interface of the first computing device to present the modified aggregate score.

Methods can include comparing, by the content distribution system, the aggregate score with preset quality heuristics; determining, by the content distribution system, that the aggregate score does not comply with the preset quality heuristics; generating, by the content distribution system in response to determining that the aggregate quality does not comply with the preset quality heuristics, one or more recommendations for improving the aggregate score; and updating, by the one or more processors, the graphical user interface of the first computing device to present the one or more recommendations.

Methods can include comparing, by the content distribution system, the aggregate score with a threshold value; determining, by the content distribution system, that the aggregate score is less than the threshold value; and preventing, by the content distribution system in response to the determining that the aggregate score is less than the threshold value, distribution of the digital component to one or more client devices.

The subject matter described herein may provide various advantages. For example, the quality information provided by the techniques discussed throughout this document can be used to limit or prevent the creation, storage, and/or transmission of low quality (e.g., less than a threshold level of quality) content assets and/or digital components, thereby reducing the computing resources, memory components, and/or network bandwidth consumed by the creation, storage, and/or transmission of these content assets and/or digital components. The quality information about content assets can be stored in an index, thereby making this quality information available during automated (or manual) creation of digital components using two or more of the content assets, such that the overall quality of the digital components can be evaluated based on the aggregate quality of the content assets being used to create the digital components. This can prevent low quality digital components from being stored and taking up limited memory space. According to the described techniques, the image quality of individual images can be determined and stored in a database. Since a large number of digital components may be generated by combining different permutations of images, this modular approach enables more efficient determination of image quality of digital components. Where a first digital component includes a first set of images and a second digital component includes a second set of images, there may be overlap between the first and second sets of images, i.e. they may include some of the same images. If an image quality of some of the second set of images has already been determined as part of determining the image quality of the first set of images, image quality scores for these images can be retrieved from the database, thereby avoiding the need to repeat evaluation of the same image and thereby making more efficient use of available computational resources. The stored quality information can also be used to identify combinations of content assets that result in a digital component having lower than a specified quality level, so that computing resources are not wasted in generating, storing, and/or transmitting digital components that include those combinations of content assets. The techniques discussed herein can also identify situations in which one or more content assets included in a digital component are illegible, occluded, or otherwise prevent visual perception of information presented by the content assets by a user, and can prevent wasting computing resources to transmit these digital components that will fail to convey information to the user. Moreover, some content publishers may evaluate digital components before publishing them. In this case, a digital component may be transmitted by a content provider to a content distribution system, and from the content distribution system to the content publisher, only to be prevented from being published. By evaluating image quality at the content distribution system, the described techniques therefore reduce processor and bandwidth requirements associated with transmission of low-quality digital components which are not likely to be displayed. The techniques discussed herein can also detect when content assets included in a digital component will lead to inadvertent user interactions with elements of the digital component that trigger network calls for additional information. Preventing distribution of these types of digital components can prevent wasted computing resources and/or network bandwidth used to initiate unintended network calls and/or the delivery of information to the user in response to those unintended network calls. As such, the techniques discussed herein can prevent the unintended transmission of information over a network, thereby making the network more efficient and reducing bandwidth requirements. Considering that a digital component that leads to unintended network calls can quickly be distributed to millions of users, the efficiencies provided using the techniques discussed throughout this document can multiply quickly. The described techniques enable evaluation, determination and/or classification of digital images and digital image quality using machine learning models. This enables more efficient evaluation of image quality and more efficient generation, evaluation and transmission of digital components at scale.

Machine learning models, such as neural network models, can be used to evaluate quality of the content assets of digital component. The machine learning models described herein can be trained on large volumes of content assets, which can in turn generate accurate evaluations of quality of a new content asset when such trained machine learning models are deployed on that new content asset. Moreover, the machine learning models can continuously learn based on new data that is being generated and relationships between inputs and outputs of various layers within each neural network model can be interrelated as desired and then modified at any time. Such continuous updating and flexibility can keep the training of the machine learning models updated, which in turn enhances accuracy of the score generated using the machine learning models.

In some implementations, a hardware accelerator can be used to deploy the machine learning models. Such hardware accelerator can include several computing units (which can also be referred to as compute tiles), among which computations of the machine learning model (e.g. neural network)—which is deployed to compute a score indicating a quality of one or more content assets within the digital components—can be distributed. Such distribution of computations across the compute tiles allow processing the neural network by using a reduced number of instructions as compared to number of instructions that would have been required had the neural network been processed by a central processing unit. Such reduction in the number of instructions increases the speed with which probabilities for multiple classes are computed, thereby reducing latency in the process of determining the score indicating a quality of one or more content assets within the digital components.

The details of one or more variations of the subject matter described herein are set forth in the accompanying drawings and the description below. Other features and advantages of the subject matter described herein will be apparent from the description, the drawings, and the claims.

BRIEF DESCRIPTION OF DRAWINGS

Like reference symbols in the various drawings indicate like elements.

DETAILED DESCRIPTION

Figure 1:
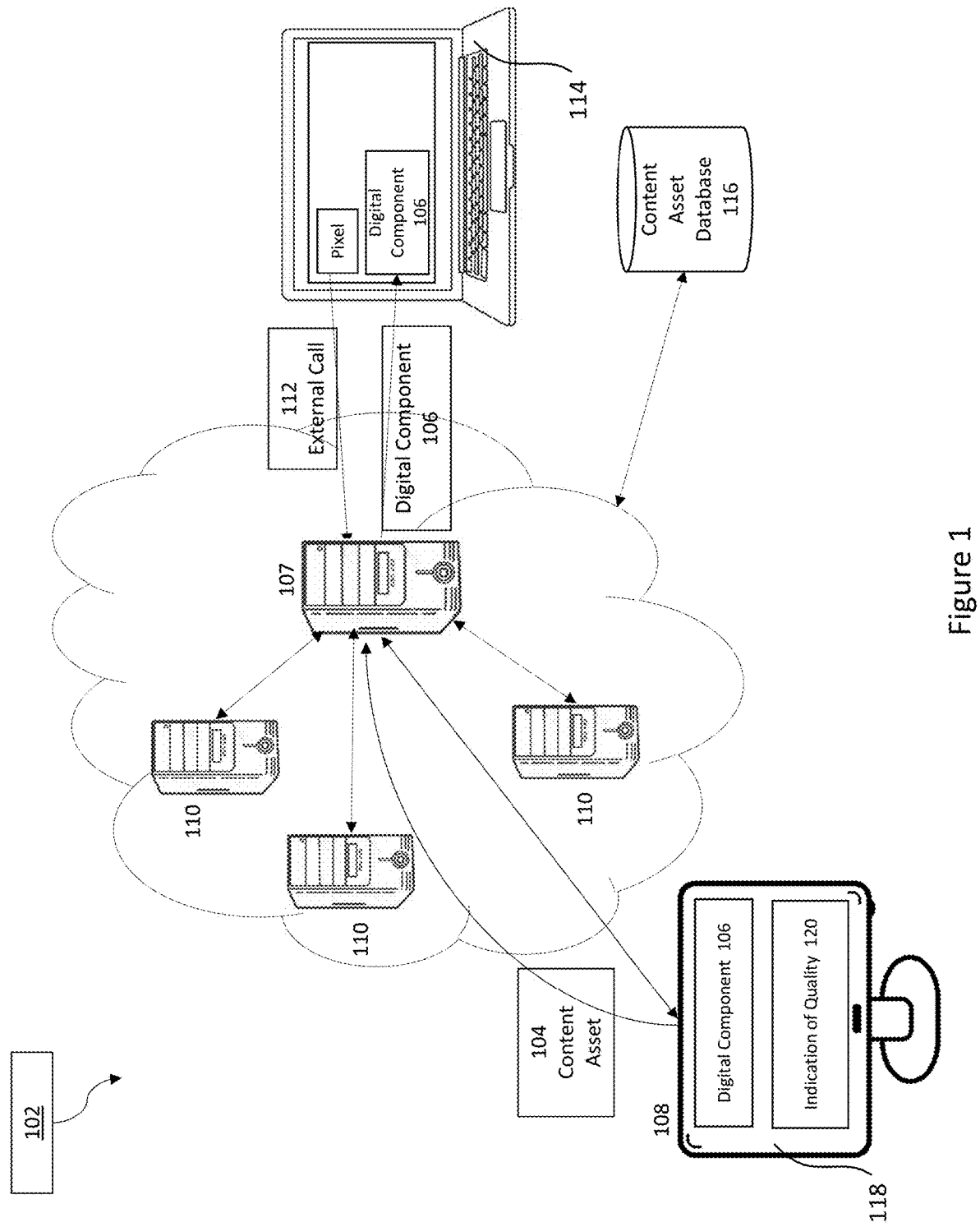
FIG. 1 illustrates a computing environment in which the quality of one or more content assets forming digital components can be used to regulate the distribution of content.

FIG. 1 illustrates a computing environment 102 in which the quality of one or more content assets 104 forming digital components 106 can be used to regulate the distribution of content. In some examples, the content assets 104 can be one or more of images, text, audio, animations, video, interactive content, any other multimedia, and/or user interface elements, such as interactive buttons, and the digital component 106 can be a combination of two or more of the content assets 104.

The computing environment 102 includes a content distribution system 107 (e.g., including one or more servers or one or more other data processing apparatus) that receives content assets 104 from content providers 108 or content servers 110 that can possibly be used to form digital components 106, assembles (e.g. combines) at least some of those content assets 104 to form different digital components 106, and transmits, in response to external calls 112, digital components 106 to respective client devices 114. For brevity, the discussion that follows will refer to content assets 104 received from content providers 108, but the discussion is equally applicable to content assets 104 received from the content servers 110, or elsewhere. In some situations, the content distribution system 107 can use quality information (e.g., image quality information) about the content assets 104 and/or digital components 106 to adjust, or regulate, which digital components 106 are distributed and/or how the digital components 106 are distributed to the client devices 114. For example, the content distribution system 107 can prevent (or limit) the distribution of digital components 106 having a quality that falls below a specified threshold quality level.

As noted above, the digital components 106 are described as being created from content assets 104 by the content distribution system 107. For example, the digital components 106 are programmatically created by the content distribution system 107 (or another computing system). For example, a content provider 108 can upload a set of content assets (e.g., images, text, and/or user interface elements, such as interactive buttons) 104 and allow the content distribution system 107 to combine different content assets 104 in different ways to create multiple different digital components 106 using the set of content assets 104.

Once a set of content assets 104 (e.g. 8 different content assets 104) have been uploaded to the content distribution system 107, the content distribution system 107 can evaluate: (a) the quality of each individual content asset within that set, (b) the quality of the entire set of content assets 104 as a whole, and/or (c) the quality of each digital component 106 formed using corresponding assets 104 (e.g. 3 content assets selected from the set of 8 content assets for that digital component 106). These evaluations are described below.

The content distribution system 107 can evaluate the quality (e.g. image quality, also referred to as visual quality) of each individual content asset 104 within the uploaded set of content assets 104, and store quality data for each of the content assets 104 in a content asset database 116. In some implementations, the content distribution system 107 can evaluate the quality of the entire set of content assets 104 provided by a content provider 108. The content distribution system 107 can present the quality—e.g. intrinsic quality (e.g. visual quality) of each individual content asset 104 and/or the overall quality of the set of content assets 104—to the content provider 108. In some examples, the evaluation of the quality of the set of images can be performed as follows. If quality heuristics (e.g. preset rules that indicate criteria for creating and distributing digital components 106) indicate that higher quality digital components 106 can be generated when the set of content assets 104 includes at least a preset number of (e.g. 5) high quality images (e.g., images having at least a specified level of quality), then the quality of the set of content assets 104 can be reduced when fewer than the present number of (e.g. fewer than 5) high quality images are included in the set. Similarly, the quality heuristics may indicate that more high quality digital components 106 can be generated when the set of content assets 104 includes at least two images having a first aspect ratio (e.g., corresponding to a square format), and at least two images having a second aspect ratio (e.g., corresponding to a landscape format). In this example, the quality level of the set of content assets 104 may be reduced when there are fewer than two images having the first aspect ratio or the second aspect ratio.

The quality level of each digital component 106 created using the content assets 104 can also be evaluated by the content distribution system 107. In some implementations, the evaluation of the digital components can be based on an aggregate quality of the content assets 104 used to create the digital component 106, and/or characteristics (e.g., visual characteristics of functional characteristics) of the digital component 106 as assembled. For example, a digital component 106 that includes a blurry image that is also classified as a racy image (e.g., having a high skin tone pixel count) may have a lower quality score than another digital component 106 having a less blurry image (e.g., deemed not blurry by a model) that is not classified as a racy image. Similarly, a digital component in which one content asset obscures or occludes some or all of text included in another content asset 104 may have a lower quality score than a different digital component 106 that arranges the same content assets 104 in way that the text is not obscured or occluded.

In situations where digital components 106 are generated by a content provider 108, the content distribution system 107 can provide an interactive user interface that can present the content provider 108 (e.g., an entity that creates and/or uploads a digital component 106) with information regarding the quality of the digital component 106, either during creation of the digital component 106 or after the digital component 106 is completed. For example, assume that the content provider 108 combines an image content asset 104 with a text content asset 104. In this example, the content distribution system 107 can present (e.g., provide data that cause presentation of) a rendering of the digital component 106 to the content provider 108, and also present an indication 104 of quality informing the content provider of the quality level of the digital component 106, as evaluated by the content distribution system 107. Using this interactive user interface, the content provider 108 is enabled to iteratively modify the digital component 106 (e.g., by rearranging locations of content assets 104 within the digital component 106 and/or changing the combination of content assets 104 included in the digital component 106), and get updated quality information from the content distribution system 107.

As discussed in detail below, the content distribution system 107 (a) trains and deploys machine learning models that generate the indication 104 of quality of one or more content assets 104 and/or a digital components 106 formed from the one or more content assets 104, (b) facilitates/controls display of such indication 104 to the content provider 108, and/or controls distribution of digital components 106 based on the indication 104 of quality.

The content assets 104 can be one or more of text, audio, images, animations, video, interactive content, or any other multimedia. In some implementations, the content assets 104 are uploaded from the content provider 108 to the content distribution system 107. The content assets can then be assembled (e.g., combined together) to form digital components 106. In one example, the digital component 106 can be a digital advertising document (which can also be referred to as an advertisement). In some implementations, the content assets 104 are used as received (e.g., without modifying those content assets 104) when assembling those content assets 104 to create digital components 106. In other implementations, at least some content assets 104 may be modified before they are assembled to form digital components 106. For example, the content distribution system 107 may deploy software modules that allow modification, on a graphical user interface of the content provider 108, of the visual characteristics—such as blurriness, orientation (e.g. landscape, portrait), resolution, color, size of various objects and/or text, any other visual characteristics, and/or any combination thereof—of images among the content assets 104. Each software module can be a part of a computer program, which can include multiple independently developed modules that can be combined or linked via a linking module. Each software module can include one or more software routines, which is a software code that performs a corresponding procedure or function.

The content distribution system 107 identifies the content assets 104 that were uploaded by the content provider 108, which may include one or more images that can be used to create different digital components 106 distributed to client devices 114. The content distribution system 107 evaluates a quality of the uploaded content assets, including the one or more images using one or more machine learning models trained to evaluate one or more visual aspects (e.g. blurriness, inclusion of objectionable material, orientation, or any other visual aspect) that are deemed indicative of visual quality. As noted above, the indications of visual quality can be stored in the content asset database 116 indexed to (e.g., with a reference to) the content asset for which the indication of visual quality was generated. Indexing the indication of visual quality to the content asset 104 facilitates the use of the indication of visual quality when the content asset 104 is used to create a digital component 106 and/or to present the indication of quality to the content provider 108.

When a digital component 106 is generated using one or more content assets 104 of the content assets 104 identified in the content asset database 116, the content distribution system 107 can determine an aggregate quality for the content assets 104 used in the digital component 106 and/or based, at least in part, an output of the one or more machine learning models indicating the visual quality of the digital component that includes one or more images (e.g. visual quality of the combination of images). A visual indication of the aggregate quality of the content assets is presented in the indication 104.

As noted above, once a set of content assets 104 (e.g. 8 different content assets 104) have been uploaded to the content distribution system 107, the content distribution system 107 can evaluate: (a) the quality of each individual content asset within that set, (b) the quality of the entire set of content assets 104 as a whole, and/or (c) the quality of each digital component 106 formed using corresponding assets 104 (e.g. 3 content assets selected from the set of 8 content assets for that digital component 106). The content distribution system 107 can make such evaluations by evaluating each content asset 104 to determine a quality of that content asset, then aggregating such quality values for all content assets within the uploaded set of content assets 104 to determine an aggregate quality for the set, and aggregating such quality values for all content assets 104 within a digital component 106 to determine an aggregate quality for the digital component. The evaluation of each content asset 104 is performed as follows.

To evaluate each content asset 104, the content distribution system 107 can train and deploy multiple machine learning models, such as a blurriness model, an objectionable content model, an orientation model, and so on. In the training phase, the content asset 104 can have one or more of multiple labels (e.g. blurriness value, objectionable content value, orientation value). Each label can characterize a corresponding quality characteristic (e.g. blurriness, inclusion of objectionable content, orientation) of the content asset (e.g. image). Each model can be trained to classify a content asset (e.g. an image) according to a respective label of the plurality of labels. Once the models (e.g. blurriness model, objectionable content model, and orientation model) are trained, the content distribution system 107 can deploy those models on the content asset 104 of the digital component 106 to generate a score for each of the labels (e.g. blurriness, objectionable content, and orientation). The content distribution system 107 can assign a weight to each score to generate weighted scores, and then combine the weighted scores to generate a combined score for that content asset 104. The content distribution system 107 can compare the combined score to one or more thresholds to generate an inference of the quality of that content asset. In some examples, the inference can be "excellent" quality, "mediocre" quality, or "poor" quality.

The content distribution system 107 can evaluate the quality of the set of content asset 104 as follows. The quality of the uploaded set of content assets 104 can be a combination (e.g. sum)—or in some implementations, average, weighted average, median, or the like—of individual qualities of various content assets 104 forming that set. In a few cases, the aggregate quality of the set of content assets 104 can be computed as a ratio of combined scores of all content assets 104 within the set to a total possible score for all of those content assets 104.

The content distribution system 107 can evaluate the quality of the digital component 106 as follows. The quality of the digital component 106 can be a combination of individual qualities of various content assets 104 forming that digital component 106. For example, the aggregate quality (e.g., average quality, weighted average, median quality, or another appropriate aggregation) of the content assets 104 of the digital component 106 can be indicated as a combination of four "excellent" images and one "mediocre" image. In another example, the quality of the digital component 106 can be noted as a combination of four "excellent" content assets 104 and three "mediocre" content assets 104. In other implementations, the aggregate quality 203 of the digital component 106 can be noted as a sum of combined scores of all content assets 104 used to form the digital component 106. In a few cases, the aggregate quality of the digital component 106 can be computed as a ratio of combined scores of all content assets to a total possible score for all content assets 104.

As noted above, the content distribution system 107 can train the one or more machine learning models, as well as deploy the trained models to generate the indication 120 for each new content asset 104. In some implementations, the content distribution system 107 may receive trained machine learning models from other one or more servers, and deploy those received machine learning models. For example, the content distribution system 107 may receive a blurriness model from a first server coupled to the content distribution system 107 via a communication network, an objectionable content model from a second server coupled to the content distribution system 107 via a communication network, an orientation model from a third server coupled to the content distribution system 107 via a communication network, and so on. In some implementations consistent with this example, the first server, the second server, and third server can be three separate servers, which can be located at either same or different physical locations. In other implementations, the server, the second server, and third server can be a single server situated at a single physical location.

While the above example discusses deploying the machine learning model (e.g. blurriness model, objectionable content model, orientation model, or the like) as it is received, in other examples the received machine learning model can be customized—to suit the specific types of content assets 104 used by the content provider 108 to form digital components 106—before such machine learning model is deployed. For example, such customization can be effective where the trained machine learning model has been trained by the other servers coupled to the content distribution system 107 based on some content assets 104 (e.g. images), but the content distribution system 107 may have access to additional relevant content assets 104 (e.g. images), which can more effectively train the machine learning model to make more accurate inferences. In some implementations, the received machine learning model (e.g. blurriness model, objectionable content model, orientation model, or the like) can first be customized to suit system requirements imposed by the content distribution system 107 before such machine learning model is deployed. The content distribution system 107 may impose system requirements based on one or more of architectural information of the content distribution system 107, system requirements (e.g. architectural information) of the content provider 108, and/or system requirements (e.g. architectural information) of one or more client devices. In some implementations, the content distribution system 107 may customize the machine learning models separately for each content provider 108, which can be beneficial when users of each computing device (e.g. advertisers) have different preferences for the types of images to be combined to form respective sets of digital components 106.

The machine learning model can be a neural network model, a nearest neighbor model, a naive Bayes model, a decision tree model, a regression model, a support vector machines (SVM), any other machine learning model, and/or any combination thereof. The machine learning model can be customized. For example, where the machine learning model is a neural network model, the machine learning model can be performed by varying one or more of the size (i.e. number of nodes) of the neural network model, the width (i.e. number of nodes in a specific layer) of the neural network model, the depth (i.e. number of layers) of the neural network model, capacity (i.e. type or structure of functions that can be learned by a network configuration; also referred to as representation capacity) of the neural network model, or the architecture (i.e. the specific arrangement of the layers and nodes) of the neural network model.

While the indication of quality of each content asset 104 is described as being "excellent" quality, "mediocre" quality, or "poor" quality, in other examples any other category name (i.e. category name other than excellent, mediocre, or poor; such as fantastic, so-so, or bad, respectively; or the like) can be used. Further, while three categories of quality are described, in some implementations, the number of categories may be any other number that is two or more. Of course, other types of quality indications can be used, such as a numeric scale (e.g., 1-10) or some other appropriate quality indication that enables the comparison of quality among multiple different content assets 104.

The evaluations of visual quality can be stored in the content asset database 116, indexed to (e.g., with a reference to) the content asset 104 for which the indication of visual quality was generated. Indexing the indication of visual quality of the content asset 104 allows the content distribution system 107 to quickly retrieve the quality of that content asset when needed (e.g. during any evaluation of quality of that content asset 104, during evaluation of any set of content assets 104 that includes that content asset 104, and during evaluation of any digital component 106 that uses that content asset 104). Such quick retrieval prevents the need for the content distribution system 107 to recalculate the quality for that content asset 104 every time such quality is needed (e.g. during any evaluation of quality of that content asset 104, during evaluation of any set of content assets 104 that includes that content asset 104, and during evaluation of any digital component 106 that uses that content asset 104). Such avoidance of the need to reevaluate the quality of content asset 104 can reduce latency during evaluations of quality. This, in turn, improves the speed at which the quality is presented (e.g. displayed) to the content provider 108 (e.g. on a graphical user interface).

The digital component 106 may be modified before distribution, which may be desirable if the digital component 106 has an overall undesirable/low quality (e.g. quality that does not meet the quality heuristics, which may be preset rules that may indicate criteria for creating and distributing digital components 106). In some examples, the content distribution system 107 may permit the content provider 108 to: (a) update one or more content assets 104 used to form the digital component 106, and/or (b) replace one or more content assets 104 used to form the digital component 106 with other one or more content assets 104. In a few examples, the content distribution system 107 may (a) automatically update one or more content assets 104 used to form the digital component 106, and/or (b) automatically replace one or more content assets 104 used to form the digital component 106 with other one or more content assets 104.

In one example, the quality heuristics can indicate a number of "excellent" content assets (e.g. images) 104 that should be present in the uploaded set of content assets 104 (from which some content assets 104 are selected to create digital components 106), orientations of various content assets (e.g. images) 108 in that uploaded set, content based guidelines for the content assets 104 in that set, and/or the like. The digital component 106 can be generated (a) automatically by the content distribution system 107 (e.g. by automatically selecting content assets 104—from the uploaded set of content assets 104—that meet satisfy the quality heuristics), (b) by the content provider 108 who selects one or more content assets 104 from the uploaded set and by the content distribution system 107 that combines the selected content assets 104 to form the digital component, or (c) by the content provider 108 who performs such selection as well as combination of content assets 104 to form the digital component. In implementations where the content provider 108 generates the digital component 106 by combining content assets 104 specific to that digital component 106, the content distribution system 107 can allow the content provider 108 to use the user interface 118 to iteratively make modifications to the digital component 106. For example, the content distribution system 107 can generate recommendations for modifications to the content assets 104 and/or digital components 106 to enhance the quality of such content assets 104 and/or digital components 106.

In some examples, when the quality of a content asset 104 is "mediocre," the content distribution system 107 can generate recommendations so that the quality can improve to "excellent," and when the quality of the content asset 104 is "poor," the content distribution system 107 can generate a first set of recommendations so that the quality can improve to "mediocre" and/or a second set of recommendations so that the quality can improve to "excellent." Some recommendations to improve the quality can be to suggest alterations of various visual characteristics—e.g. brightness, contrast, color, color intensity, hue, saturation, size, noise, sharpness, luminance, undesirable elements, objectionable elements, any other characteristics, and/or any combination thereof—of an identified image.

In implementations where the content distribution system 107 evaluates the uploaded set of content assets 104 collectively, the content distribution system 107 can generate recommendations for modification of the content assets 104 within that set. In some implementations, the content distribution system 107 can generate such recommendations when, for example, the set of content assets 104 is unable to support creation of a digital component 106 pursuant to the quality heuristics. For example, recommendations can be generated when preset rules for visual quality of the digital component 106 indicate that the digital component 106 must include 3 square images, but the set of content assets includes only 2 square images. In another example, recommendations can be generated when preset rules for visual quality of the digital component 106 indicate that the digital component 106 must include 3 "excellent" quality square images, but the set of content assets includes only 2 "excellent" quality square images.

In implementations where the content distribution system 107 evaluates the digital component 106, the content distribution system 107 can generate recommendations for modification of the content assets 104 forming that digital component 106. In some implementations, the content distribution system 107 can generate such recommendations when, for example, the digital component 104 does not satisfy the quality heuristics (i.e. rules). For example, recommendations can be generated when preset rules for visual quality of the digital component 106 indicate that the digital component 106 must include 3 square images, but the digital component is made of only 1 square image. In another example, recommendations can be generated when preset rules for visual quality of the digital component 106 indicate that the digital component 106 must include 2 "excellent" quality square images, but the set of content assets includes only 1 "excellent" quality square images. In some recommendations, the content distribution system 107 can recommend rearranging locations of one or more content assets 104 within the digital component 106 and/or change the combination of content assets 104 included in the digital component 106 to improve the overall quality of the digital component 106.

Once the recommendations are generated for modifying one or more content assets (in any implementation—i.e. implementation where each individual content asset 104 is evaluated, implementation where the uploaded set of content assets 104 is evaluated, and/or implementation where the digital component is evaluated), the content distribution system 107 can render the recommendations on the graphical user interface 118. In response to such recommendations, the content distribution system 107 may update the graphical user interface 118 to display an option, which the content provider 108 can select to accept or reject the automatic improvements made to the one or more content assets 104. The content distribution system 107 can iteratively update the quality of the uploaded set of content assets 104 and/or the digital component 106 (i.e. update the quality assessment every time the content provider 108 makes any change), and display the updated indication of quality on the user interface 118.

In some implementations, the content distribution system 107 can reevaluate the completed digital component 106 for other indications of quality, e.g., overlapping elements, trick to click, bad cropping, giant button, and/or the like. Such secondary evaluation of the digital component 106 can be used to generate recommendations for augmenting the aggregated quality. For example, if a button covers the racy or blurry portion of the image, it may be that the total quality of the digital component 106 is better than the aggregate quality of the constituent parts. On the other hand, a button that is too big and covers most of the image may lower the quality even if the assets individually are high quality.

In implementations where the content distribution system 107 generates the digital components 106 by combining the content assets 104, the content distribution system 107 can automatically make improvements made to one or more content assets 104 and/or the digital component 106 (i.e. without any interaction with the content provider 108). For example, the content distribution system 107 can adjust the location of a button asset overlaid on an image asset in a way that increases the quality of the overall digital component 106 (e.g., by covering a racy portion of the image). The content distribution system 107 can update the quality of the digital component 106 (i.e. update the quality assessment every time the content provider makes any change) once such improvements are made.

In some implementations, the content distribution system 107 can restrict distribution of a digital component 106 based on the final quality of the digital component 106 as follows. Preset quality rules/heuristics may exist for digital components 106 that may indicate criteria for creating and distributing digital components 106. The content distribution system 107 can compare the digital component 106 (which may have been updated as noted above) to the preset quality rules/heuristics to determine whether the digital component 106 is appropriate to be distributed. For example, if the quality heuristics indicate a criteria—e.g. one or more of (a) the digital component 106 must not contain a "poor" quality image, (b) the digital component 106 must not contain a "racy" image, (c) the digital component 106 must not have a "landscape" image, (d) the digital component 106 must have a single image in the "square" format, and/or the like—then the content distribution system 107 may permit distribution of a digital component 106 that satisfies that criteria but prevent distribution of another digital component 106 that does not satisfy that criterion. The content distribution system 107 can further or alternately restrict digital components 106 for distribution based on satisfaction of such criterion. Thus the content distribution system 107 can automatically restrict distribution of a digital component 106.

While automatic control of distribution is described above, in some implementations, the content distribution system 107 may give the content provider 108 an opportunity to manually control distribution of the digital component 106 based on the quality determined by the content distribution system 107. For example, the content distribution system 107 may provide, on an interactive user interface 118 of the content provider 108, an indication 120 of the quality of the digital component 106 along with related quality heuristic. The interactive user interface 118 may further provide options to the content provider 108 to proceed with distributing the digital component 106, prevent the distribution of the digital component 106, and/or modify the digital component 106 (e.g. to improve the quality of the digital component 106 to satisfy the quality heuristics). In such implementations, the content provider 108 may have control over distribution—e.g., the content provider may allow the distribution of a digital component 106 even when the digital component 106 does not satisfy the quality heuristics, or may prevent the distribution of a digital component 106 even when the digital component 106 satisfies the quality heuristics.

The content provider 108 can interact with the content distribution system 107 by way of a computing device, such as a laptop computer, a desktop computer, a tablet computer, a phablet computer, a phone, a kiosk computer, any other computing device, and/or any combination thereof. The computing device can be configured to be managed by, for instance, a domain host (e.g. advertiser) by, for example, inputting authentication data such as a username and a password, biometric data, security data obtained from an external device (e.g., security data embedded on a security key fob, one time password obtained from an email or a software application connected to the computing device, or the like), any other authentication data, and/or any combination thereof.

Users interact with the content distribution system 107 using a client device 114, such as a laptop computer, a desktop computer, a tablet computer, a phablet computer, a phone, a kiosk computer, any other computing device, and/or any combination thereof. The client device 114 can be configured to be used by any end-user. The content asset database 116 can be a memory device, such as a computer-readable storage device, a computer-readable storage substrate, a random or serial access memory array or device, any other one or more storage devices, and/or any combination thereof. Any of the content servers 110 or the content distribution system 107 can be a system that has at least one programmable processor, and a machine-readable medium storing instructions that, when executed by the at least one processor, cause the at least one programmable processor to perform various operations described herein.

Each of the content servers 110 can be a system that has at least one programmable processor, and a machine-readable medium storing instructions that, when executed by the at least one processor, cause the at least one programmable processor to perform various operations such as collecting content assets 104 and transmitting them to the content provider 108 as needed for the digital component 106. In some implementations, the content server 110 can be a laptop computer, a desktop computer, a tablet computer, a phablet computer, a phone, a kiosk computer, any other computing device, and/or any combination thereof.

The arrows between various components shown in FIG. 1 can indicate a communication network between those components, which can include either a wired connection or a wireless connection over a local area network, a wide area network, internet, intranet, Bluetooth network, infrared network, any other one or more networks, and/or any combination thereof.

Figure 2A:
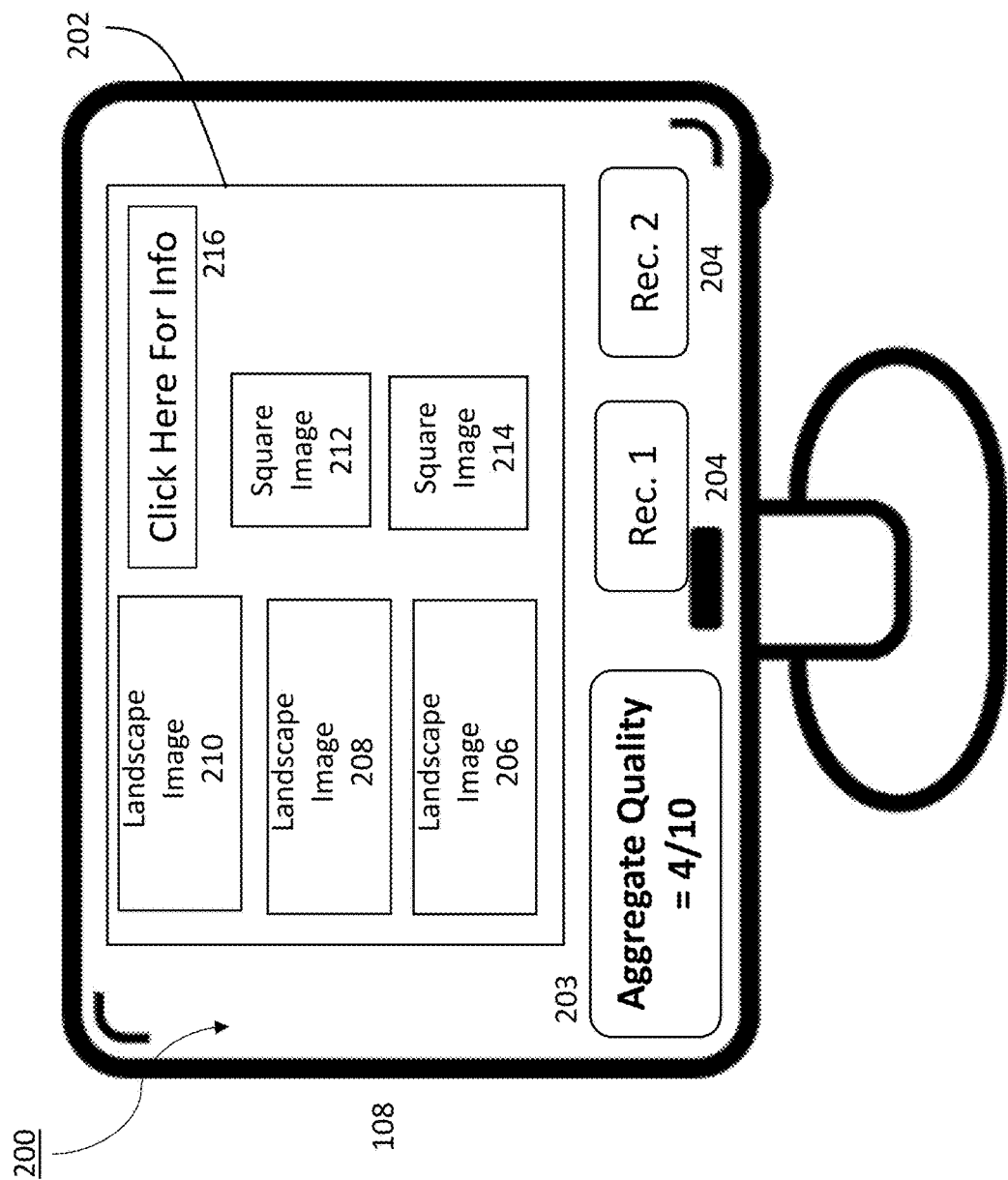
FIGS. 2A and 2B illustrate a graphical user interface of the computing device as rendered or updated by the content distribution system.
Figure 2B:
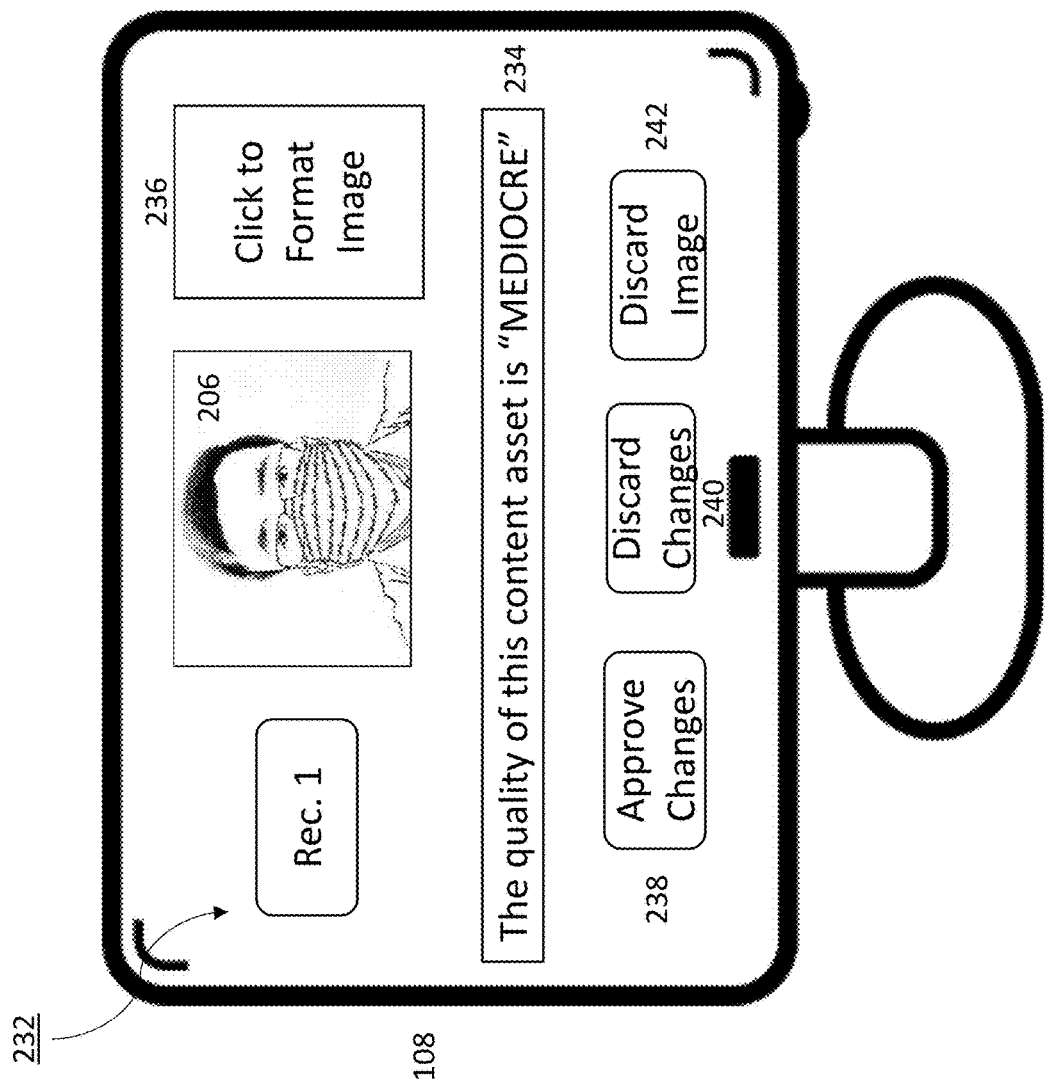

FIGS. 2A and 2B illustrate graphical user interfaces that can be presented on the content provider 108. FIG. 2A illustrates a graphical user interface 200 that displays: (a) the set 202 of content assets 104 (e.g. images) uploaded by the content provider 108, from which specific content assets 104 are selected to form the digital component 106, (b) an aggregate quality 203 of all content assets 104 within the set 202, and (c) buttons 204 for various recommendations to improve the quality of (i) at least one content asset 104 forming the set 202 or (ii) the set 202 as a whole so that a digital component 106 complies with the quality heuristics (e.g. preset rules that may indicate quality thresholds for the digital component 106 or content assets 104 therein so that the digital component 106 may be distributed to various client computing devices 114). In some examples, the digital component 106 can be a digital advertising document such as an advertisement formed by combination of two or more content assets 104. The content assets 104 within the set 202 in this example include images 206, 208, 210, 212, and 214, and text 216. While content assets 104 within the set 202 are described as images or text, in some implementations the content assets 104 can also include audio, animations, video, interactive content, other multimedia, and/or user interface elements such as interactive buttons.

Any of the images 206-218 can be a digital image with any format, such as Joint Photographic Experts Group (JPEG), JPEG File Interchange Format (JFIF), Exchangeable image file format (Exif), Tagged Image File Format (TIFF), Graphics Interchange Format (GIF), bitmap (BMP), Portable Network Graphics (PNG), portable pixmap (PPM), portable graymap (PGM), portable bitmap (PBM), Portable aNy Map (PNM; which can be a combination of PPM, PGM, and PBM), a raw image format, and/or any other format.

The aggregate quality 203 of the set 202 can be generated as follows. First, the content distribution system 107 can evaluate a quality of each content asset 104 forming the set (i.e. quality of each of images 206, 208, 210, 212, and 214, and text 216). To do so, the content distribution system 107 can train and deploy multiple machine learning models, such as a blurriness model, an objectionable content model, an orientation model, and so on. In the training phase, each content asset 104 (e.g. one of images 206-214) can have one or more of multiple labels (e.g. blurriness value, objectionable content value, orientation value). Each label can characterize a corresponding quality characteristic (e.g. blurriness, inclusion of objectionable content, orientation) of the image. Each model can be trained to classify an image according to a respective label of the plurality of labels. Once the models (e.g. blurriness model, objectionable content model, and orientation model) are trained, the content distribution system 107 can deploy those models on each image of images 206-214 to generate a score for each of the labels (e.g. blurriness, objectionable content, and orientation). The content distribution system 107 can assign a weight to each score to generate weighted scores, and then combine the weighted scores to generate a combined score for that image. The content distribution system 107 can compare the combined score to one or more thresholds to generate an inference of the quality of that content asset (e.g. image). In some examples, the inference can be "excellent" quality, "mediocre" quality, or "poor" quality.

While the indication of quality of each content asset 104 is described as being "excellent" quality, "mediocre" quality, or "poor" quality, in other examples any other category name (i.e. category name other than excellent, mediocre, or poor; such as fantastic, so-so, or bad, respectively; or the like) can be used. Further, while three categories of quality are described, in some implementations, the number of categories may be any other number that is two or more. Of course, other types of quality indications can be used, such as a numeric scale (e.g., 1-10) or some other appropriate quality indication that enables the comparison of quality among multiple different content assets 104.

The aggregate quality 203 of the set 202 can be noted as a combination of four "excellent" images and three "mediocre" images, in some implementations. In some instances, the aggregate quality 203 of the set 202 can be noted as a sum of combined scores of all images 206-214. In a few cases, the aggregate quality 203 of the set 202 can be computed as a ratio of combined scores of all images 206-214 to a total possible score for all images 206-214, as shown in FIG. 2A. In the shown example, the total possible score for all images 206-214 is 10.

The content distribution system 107 can generate recommendations for improving the quality of the set 202. In some examples, the content distribution system 107 may generate such recommendations only when the aggregate quality 203 of the set 202 is below a threshold (e.g. below 5/10). Such threshold may indicate a minimum quality value that complies with the quality heuristics for the digital component 106 that is to be formed using one or more content assets 104 within the set 202. In a few examples, if the quality heuristics indicate a criterion that the digital component 106 must contain an image with "excellent" quality in a "landscape format," the content distribution system 107 may evaluate the images 206-214 to determine whether such criterion is satisfied. If not, the content distribution system 107 may make a recommendation that (a) quality of a "landscape" image out of images 206-210 may be improved or (b) such image be replaced with another "landscape" image having "excellent" image quality. The graphical user interface 200 provides the content provider 108 the option of clicking a button 204 corresponding to such recommendation to make modifications to individual images on the graphical user interface of FIG. 2B.

FIG. 2B illustrates a graphical user interface 232 that allows the content provider 108 to make modifications to an individual image 206 or other asset within the set 202 of content assets 104 discussed above with respect to FIG. 2A so as to improve the quality of the image 206 and thus the aggregate quality 203 of set 202. The graphical user interface 232 indicates the quality of the image as "excellent," "mediocre," or "poor" as noted above. In the shown example, the quality of the image 206 is determined as "mediocre" by deploying the machine learning models, as explained above with respect to FIG. 2A. The graphical user interface 232 can provide the content provider 108 an option 236 to format the image 206. The formatting option 236 can include an option to automatically modify the image 206, as recommended by the content distribution system 107 to improve the quality of the image 206. In some implementations, the formatting option 236 can allow the content provider 108 to manually make changes to the image 206.

The graphical user interface 232 further includes an option 238 to allow the content provider 108 to accept modifications to the image 206, another option 240 to allow the content provider 108 to reject modifications to the image 206, and another option 242 to allow the content provider 108 to discard the image from the digital component 108. The content provider 108 may want to remove the image from the digital component 108 if the image has a very poor quality that cannot be improved much.

When the image 206 is modified or improved, the content distribution system 107 can iteratively update the quality indication 234 to correspond to the modified or improved image 204 (i.e. deploy the trained machine learning models to update the quality assessment every time the image 204 is modified). The quality of each of the images 206-214 (which includes the updated quality for the image 206) can be used to generate the aggregate quality 203 for the set 202.

Figure 3:
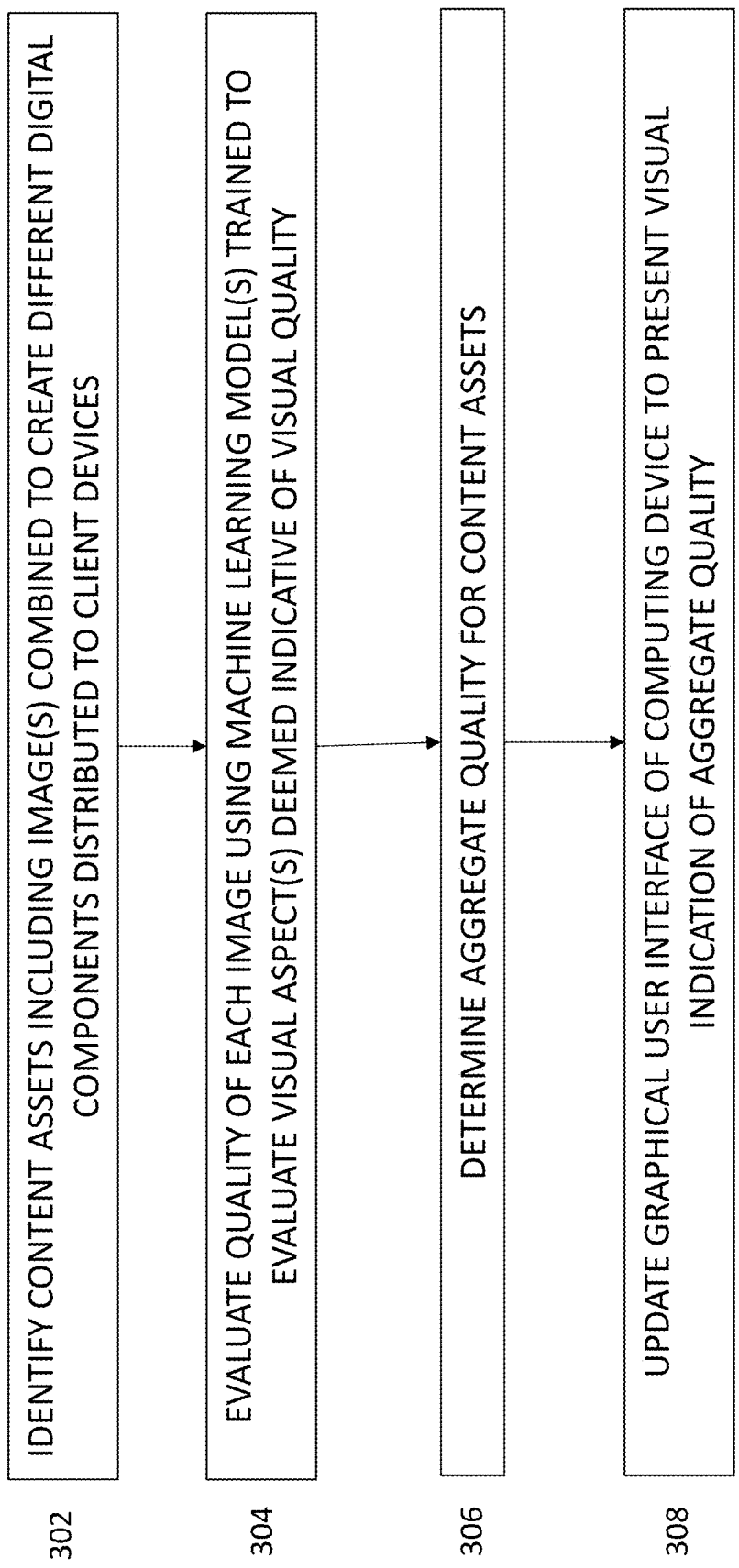
FIG. 3 illustrates a process implemented by the content distribution system to facilitate display of the indication of quality of a set of content assets on the computing device.

FIG. 3 illustrates a process implemented by the content distribution system 107 that facilitates display of the quality—of each individual content asset 104, of the set 202 of content assets, and/or the digital component 106—to the content provider 108. The content distribution system 107 can identify, at 302, content assets 104—including images—present in the set 202 (i.e. content assets that can be combined to create different digital components 106 that can be distributed to one or more client devices 114). The identification of content assets 104 can include retrieving specific content assets 104 from the content servers 110 and/or the content asset database 116. If the quality of a content asset 104 has been determined before, such quality is indexed next to the content asset 104 in the content asset database 116. Such indexing allows a simple retrieval of the quality for the content asset 104 from the content asset database 116 when required, which can prevent the need to recalculate the quality of the content asset 104.

The content distribution system 107 can evaluate, at 304, a quality of each image forming the set 202 (e.g. each of images 206-214 in the set 202) using one or more machine learning models trained to evaluate visual aspects (e.g. blurriness, objectionability, orientation, and/or the like) that are deemed indicative of visual quality. For example, the content distribution system 107 can train and deploy those one or more machine learning models. In some implementations, the content distribution system 107 can separately train a blurriness model, an objectionable content model, an orientation model, and/or any other machine learning model trained to detect some image-quality characteristic. The content distribution system 107 can, in some implementations, create as well as train the machine learning models. In other implementations, the content distribution system 107 can obtain from other one or more servers machine learning models and can then further train those models to, for example, suit the architectural details of the content provider 108 and various client devices 114. The content distribution system 107 can deploy the trained models to generate respective quality scores. For example, the blurriness model can generate a blurriness score quantifying blurriness in the image, the objectionable content model can generate an objectionable content score quantifying objectionability of content in the image, the third model can generate an orientation score quantifying compatibility of width and height of the image with a standard width and height of a typical digital component 106 (e.g. a digital component with preset sizes of width and height), and so on.

The content distribution system 107 can determine the quality of the image based on output of the one or more machine learning models indicating the visual quality of each image. In some implementations, the content distribution system 107 can assign a weight to each score generated by a respective machine learning model to generate weighted scores. For example, the content distribution system 107 can assign a first weight to the blurriness score, a second weight to the objectionable content score, and a third weight to the orientation score. The content distribution system 107 can then combine the weighted scores to generate a combined score for the image. The content distribution system 107 can compare the combined score to one or more thresholds to generate an inference of the quality of the image. For example, if the score is less than a lower threshold, the content distribution system 107 generates an inference that the image has a "poor" quality; if the score is between the lower threshold and an upper threshold (with both lower and upper thresholds inclusive in the range), the content distribution system 107 generates an inference that the image has a "mediocre" quality; and if the score is more than the upper threshold, the content distribution system 107 generates an inference that the image has an "excellent" quality. Such inference is also referred to herein as the indication 120 of quality.

The content distribution system 107 can determine, at 306, an aggregate quality 203 of content assets 104 (e.g. images 206-214) forming the set 202. The aggregate quality 203 of the set 202 can be noted as a combination of four "excellent" images and three "mediocre" images, in some examples. In some instances, the aggregate quality 203 of the set 202 can be computed as a sum of combined scores of all images 206-214 forming the digital component 106. In some cases, the aggregate quality 203 of the digital component 106 can be calculated as a ratio of combined scores of all images 206-214 to a total possible score for all images 206-214 (as shown in FIG. 2A, where the total possible score for all images 206-214 is 10).

The content distribution system 107 can update, at 308, a graphical user interface 200 of the content provider 108 to present the visual indication of the aggregate quality 203 of the set 202. The updating of the graphical user interface 203 can include transmitting the visual indication of the aggregate quality 203 of the images forming the set 202 to the content provider 108.

In some implementations, the content distribution system 107 can also generate recommendations for modifications to a content asset 104 to enhance the quality of such content asset 104, and in turn the quality of the set 202 that includes that content asset 104. In some examples, when the quality of a content asset 104 indicates that the quality is "mediocre," the content distribution system 107 can generate recommendations so that the quality can improve to "excellent," and when the quality of a content asset 104 is determined as "poor," the content distribution system 107 can generate a first set of recommendations so that the quality can improve to "mediocre" and/or a second set of recommendations so that the quality can improve to "excellent." Some recommendations to improve the quality can be to suggest alterations of various characteristics—e.g. brightness, contrast, color, color intensity, hue, saturation, size, noise, sharpness, luminance, undesirable elements, objectionable elements, any other characteristics, and/or any combination thereof—of the image. In some further implementations, the content distribution system 107 can automatically improve the image according to the suggested alterations. The content distribution system 107 may update the graphical user interface of the content provider 108 to display an option, which the content provider 108 can select to accept or reject the automatic improvements made to the image.

Figure 4:
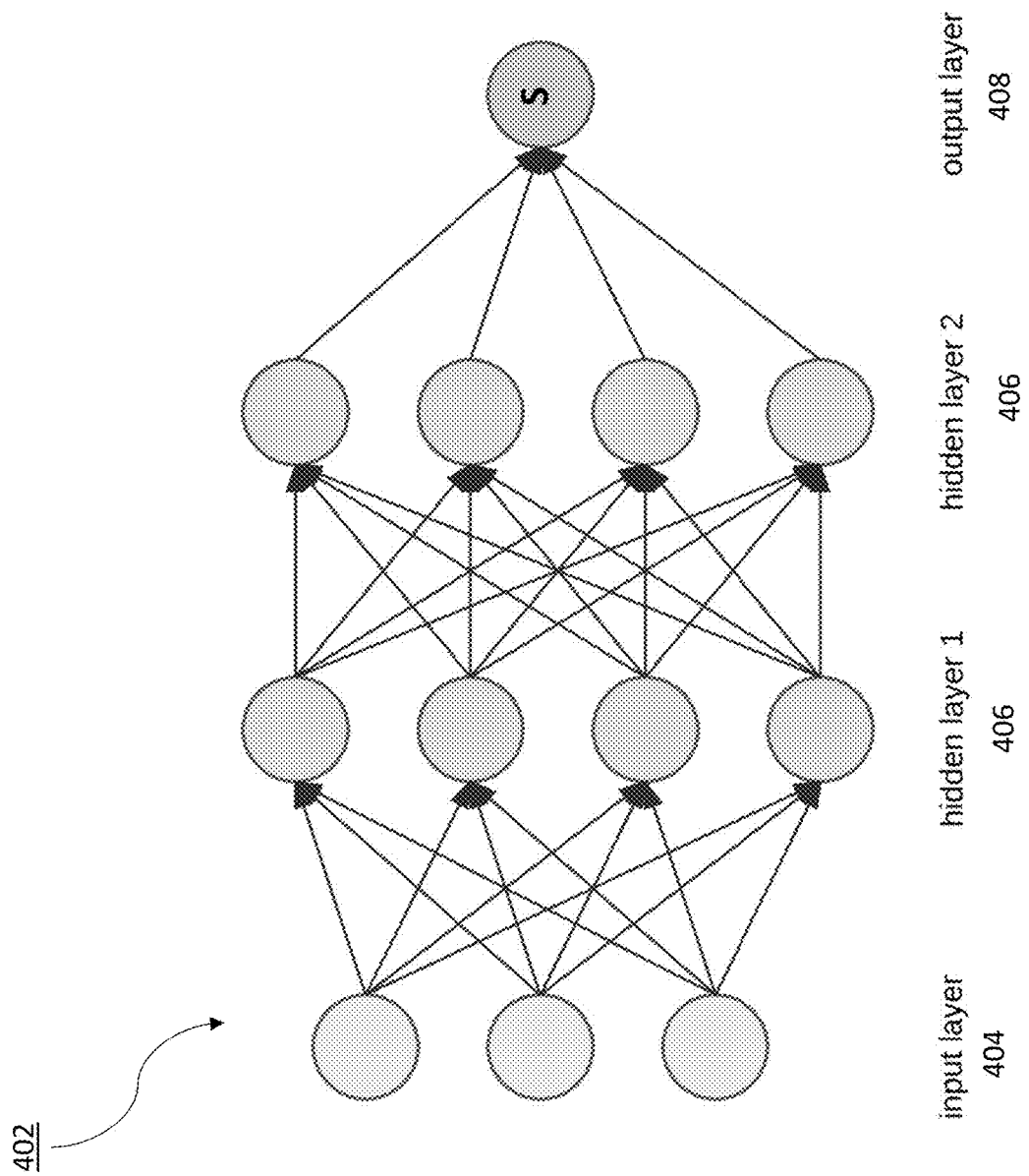
FIG. 4 illustrates an example of a machine learning model trained and deployed by the content distribution system.

FIG. 4 illustrates an example of a machine learning model trained and deployed by the content distribution system 107. The shown machine learning model is a neural network model 402. The neural network model 402 can also be simply referred as a neural network, an artificial neural network, or an artificial neural network model. Although a neural network model has been described, in other implementations the machine learning model can be any other machine learning model such as a nearest neighbor model, a naive Bayes model, a decision tree model, a regression model, a support vector machines (SVM), any other machine learning model, and/or any combination thereof (which can include any such model in combination with a neural network model). The type of neural network model 402 can be a feedforward neural network, as shown. In other implementations, the neural network models 402 can be of any other type, such a radial basis function neural network, a multilayer perceptron, a convolutional neural network, a recurrent neural network, a modular neural network, a sequence to sequence model that consists of two recurrent neural networks, and/or any other type of neural network.

The neural network model 402 can have multiple layers, including an input layer 404, one or more interior layers (also referred to as hidden layers) 406, and an output layer 408. Each of the layers 404, 406 and 408 can have one or more nodes, which can also be referred to as neurons or artificial neurons. For example, in the shown implementation, layer 404 has three nodes, each of the layers 406 has four nodes, and the layer 408 has a single node. Each node (also referred to as a neuron) is a computational unit. In some implementations, the number of hidden layers and the number of nodes in each corresponding layer can be varied based on amount/number of images on which the model is trained. For example, when the amount/number of images is very high (e.g. more than a threshold such as 1000, 5000, 10000, 100000 or any other threshold value specific to the implementation), more number of nodes and/or number of layers may be used to expedite the training process as well as inference during the deployment process. In some implementations, the numbers of nodes and/or layers may be varied as the training phase progresses so as to experimentally determine an ideal number of nodes and/or layers in the neural network 402.

The input layer 404 is configured to receive, as input, a content asset (e.g. image). In the training phase for that model 402 (i.e. duration of time when that model 402 is being trained), the input layer 402 receives the images on which the model 402 is trained. In the deployment phase (i.e. duration of time when the trained model 402 is being used to generate inferences), the input layer 402 receives the new image (e.g. image 204) for which quality is to be inferred. Each node (also referred to as a neuron) of the input layer 404 is a computational unit that combines data from the images in some configurable manner, and has an output connection.

The interior layers 406 are also referred to as hidden layers because they are not directly observable from the input and output of the system that implements the neural network model 402. Each node (also referred to as a neuron) of each hidden layer 406 is a computational unit that has one or more weighted input connections, a transfer function that combines the inputs in some configurable manner, and an output connection.

The output layer 408 outputs a score for the image (e.g. any of the images 206-214) that is input. For example, the output layer 408 of a blurriness model can output a blurriness score, the output layer 408 of an objectionable content model can output an objectionable content score, the output layer 408 of an orientation model can output an orientation score, and so on. In the training phase, each model 402 can be trained on different (or same, in other implementations) set of images. In the deployment phase, however, each model receives the same new image (e.g., any of the images 206-214) on which inference of quality is to be made. The output layer 408 in the shown example has a single node that has one or more weighted input connections, and a transfer function that combines the inputs in some configurable manner to generate a score (e.g. blurriness score where the model is a blurriness model, objectionable content score where the model is an objectionable content model, orientation score where the model is an orientation model, or the like).

In some implementations, a hardware accelerator can be used to deploy the machine learning models. Such hardware accelerator can include several computing units (which can also be referred to as compute tiles), among which computations of the machine learning model (e.g. neural network)—which is deployed to compute a score indicating a quality of one or more content assets within the digital components—can be distributed. Such distribution of computations across the compute tiles allow processing the neural network by using a reduced number of instructions as compared to number of instructions that would have been required had the neural network been processed by a central processing unit. Such reduction in the number of instructions increases the speed with which probabilities for multiple classes are computed, thereby reducing latency in the process of determining the score indicating a quality of one or more content assets within the digital components.

Figure 5:
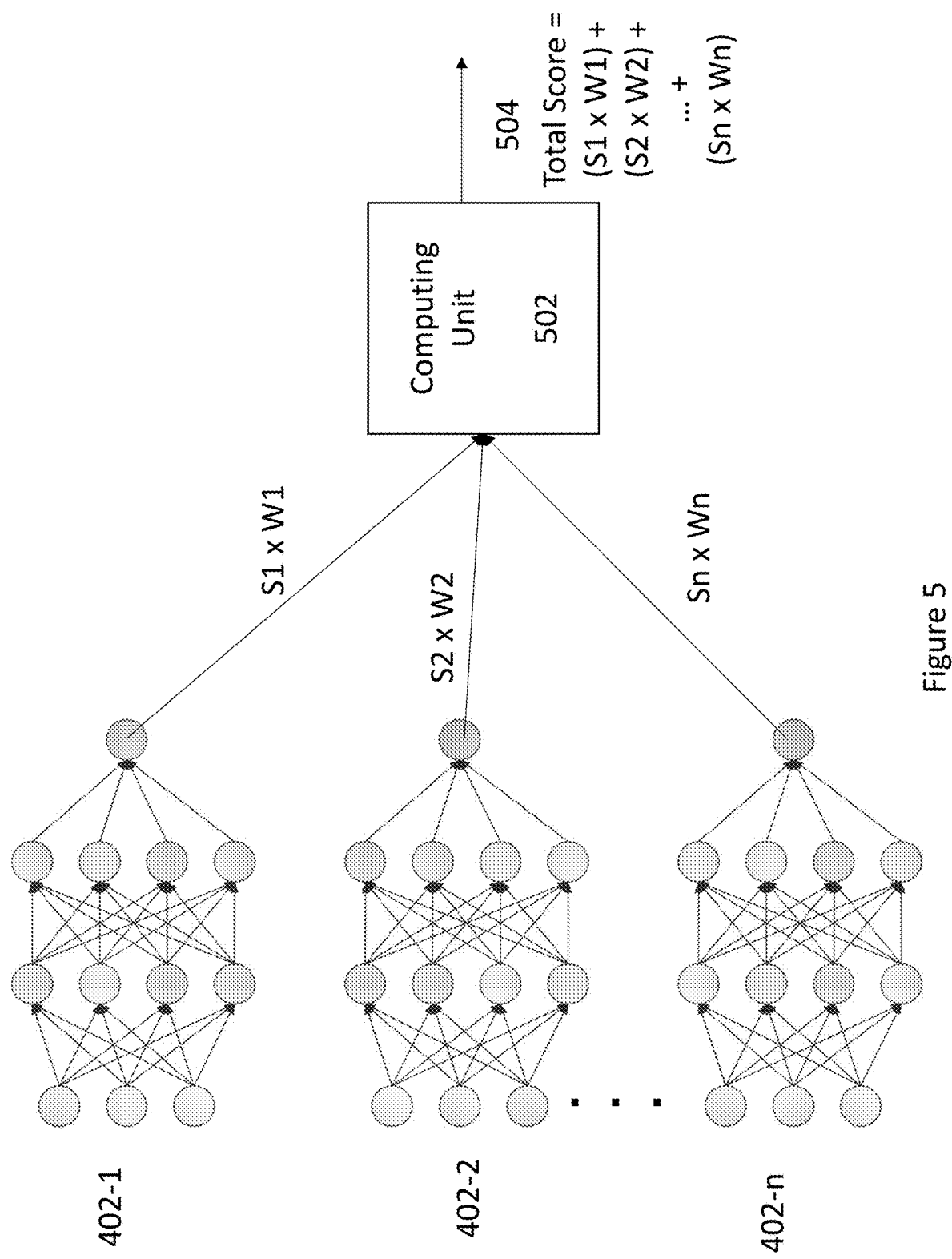
FIG. 5 illustrates simultaneous deployment of multiple machine learning models to determine the quality of a new image within the digital component.

FIG. 5 illustrates simultaneous deployment of multiple machine learning models 402-1, 402-2, ... and 402-n to determine the quality of the new image (e.g. any of the images 206-214). Here, n can be any fixed integer value. Each model 402-i (where i is any integer value ranging from 1 to n) can receives as input the new image (e.g. any of the images 206-214) and outputs a score Si quantifying a visual characteristic that model 402-i is trained to determine. For example, the model 402-1 can be a blurriness model that can receive as input the image 204 and output a blurriness score S1, the model 402-2 can be an objectionable content model that can receive as input the image 204 and output an objectionable content score S2, ... and the model 402-n can be an orientation model that can receive as input the image 204 and output an orientation score Sn. While the discussion here focuses on specific machine learning models, in some implementations additional models (not shown) can be additionally or alternately trained and deployed to detect large buttons in the digital component 106, trick to click issues in the digital component 106, raciness of an image within the digital component 106, poor cropping of an image of the digital component 106, inappropriate text overlay in the digital component 106, location of a logo in the digital component 106, and/or the like, and classify the digital component accordingly.

Each of the models 402-i (where i is any integer value ranging from 1 to n) can have different hidden layers 406 (e.g. different number of hidden layers 406 and/or different number of nodes in each hidden layer 406), as hidden layers 406 can be added or modified between different models 402i to adapt each model to make corresponding inferences.

The content distribution system 107 can include a computing unit (e.g. one or more processors) 502 that can assign a weight Wi (where i is any fixed integer ranging from 1 to n) to the score Si of each model 402-i, and then add the weighted score WiSi for all the models to generate a total score 504 (which can also referred to as combined score).

The total score 504 can indicate the quality of the input image (e.g. any of the images 206-218). The content distribution system 107 can compare the total score 504 to one or more thresholds to generate an inference of the quality of the input image (e.g. any of the images 206-218). In some examples, the inference can be "excellent" quality, "mediocre" quality, or "poor" quality. While the indication 120 of quality is described as being "excellent" quality, "mediocre" quality, or "poor" quality, in other examples any other category name (i.e. category name other than excellent, mediocre, or poor; such as fantastic, so-so, or bad, respectively; or the like) can be used. Further, while three categories of quality are described, in some implementations, the number of categories may be any other number that is two or more.

The content distribution system 107 can determine an aggregate quality 203 of content assets 104 (e.g. images 206-214) forming the set 202. The aggregate quality 203 of the set 202 can be noted as a combination of four "excellent" images and three "mediocre" images, in some examples. In some instances, the aggregate quality 203 of the set 202 can be computed as a sum of combined scores of all images 206-214 forming the set 202. In some cases, the aggregate quality 203 of the digital component 106 can be calculated as a ratio of combined scores of all images 206-214 to a total possible score for all images 206-214 (as shown in FIG. 2A, where the total possible score for all images 206-218 is 10).

The content distribution system 107 can update a graphical user interface of the content provider 108 to present the visual indication 120 of the aggregate quality 203 of the content assets 104 forming the digital component 106. The updating of the graphical user interface can include transmitting the visual indication of the aggregate quality 203 of the images forming the set 202 to the content provider 108.

While specific neural network models are being described here, in other implementations any other neural network model or any suitable machine learning model can be used that would not compromise latency and processing ability. For example, any neural network model 402-i (where i is any fixed integer ranging from 1 to n) can be a feedforward neural network (as shown), or any other neural network such as a radial basis function neural network, a multilayer perceptron, a convolutional neural network, a recurrent neural network, a modular neural network, a sequence to sequence model that consists of two recurrent neural networks, and/or any other type of neural network.

Figure 6:
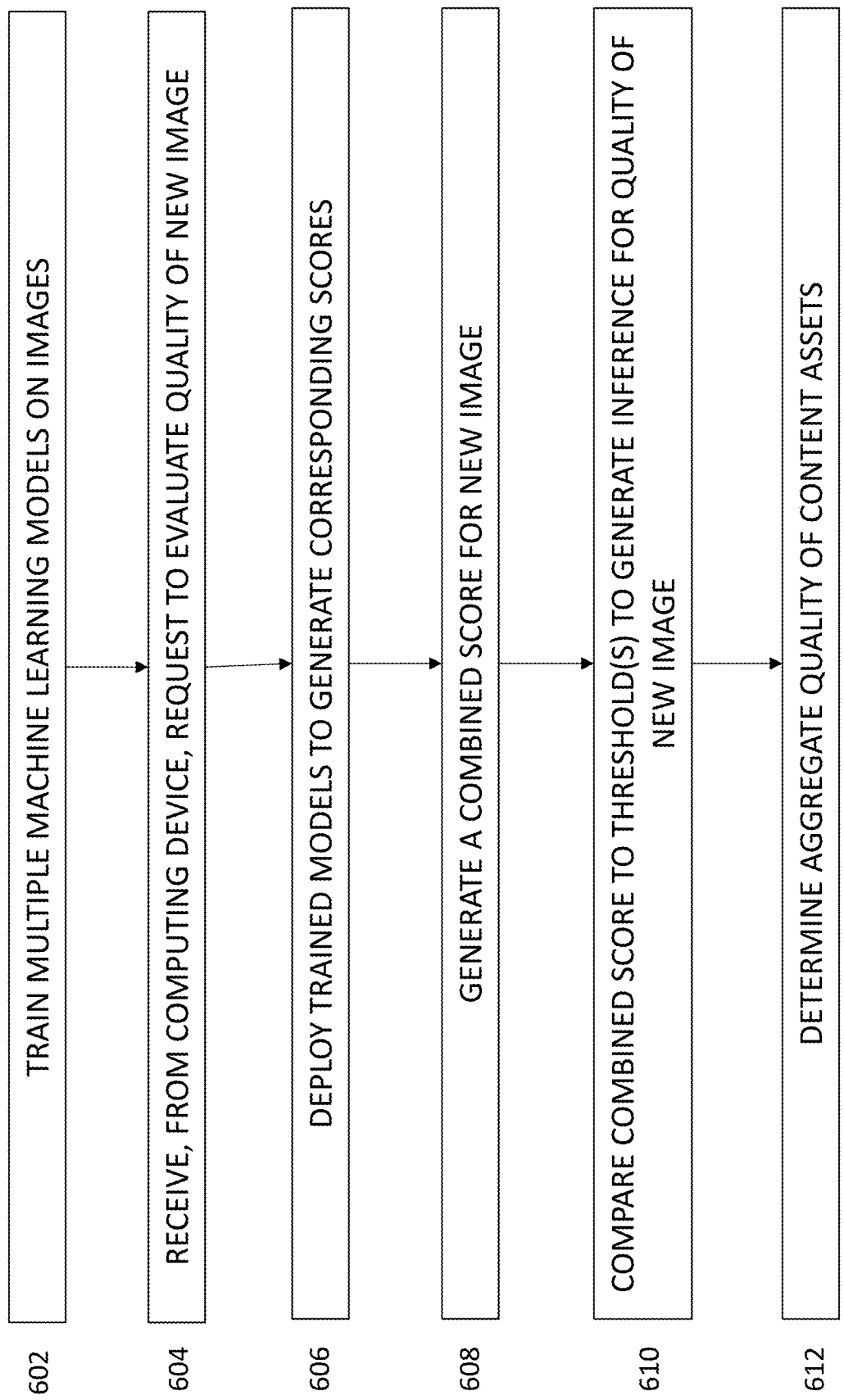
FIG. 6 illustrates a process implemented by the content distribution system to train and deploy machine learning models to determine quality of a content asset.

FIG. 6 illustrates a process implemented by the content distribution system 107 to train and deploy machine learning models 402-i (where i is any fixed integer ranging from 1 to n). The content distribution system 107 can train, at 602, multiple machine learning models (e.g. blurriness model, objectionable content model, and orientation model) on multiple images obtained from content servers 110 and/or content asset database 116. During such training, each of those images is assigned scores (e.g. blurriness score, objectionable content score, orientation score) indicating quality characteristics (e.g. blurriness, amount of objectionable content, orientation compatibility with digital component 106) of the image. Each machine learning model (e.g. blurriness model, objectionable content model, or orientation model) is trained to score an image for a respective quality characteristic (e.g. blurriness, amount of objectionable content, orientation compatibility with digital component 106, respectively).

The content distribution system 107 can receive, at 604 from the content provider 108, a request to evaluate quality of new image (e.g. any of images 206-214) included in a set 202 of content assets 104 as uploaded by the content provider 108. In response to such request, the content distribution system 107 can deploy, at 606, the machine learning models (e.g. blurriness model, objectionable content model, and orientation model) on the new image to generate scores S1, S2, ... , Sn for each quality characteristic (e.g. score S1 for blurriness, score S2 for amount of objectionable content, ... and score Sn for orientation compatibility).

The content distribution system 107 can include a computing unit (e.g. one or more processors) 502 that can assign a weight Wi (where i is any fixed integer ranging from 1 to n) to the score Si of each model 402-i (e.g. each of blurriness model, objectionable content model, and orientation model). The content distribution system 107 can combine, at 608, the weighted score WiSi for each model to generate a combined score 504 for the image (e.g. any of images 206-214). The total score 504 can indicate the quality of the input image (e.g. any of images 206-214).

The content distribution system 107 can compare, at 610, the total score 504 to one or more thresholds to generate an inference of the quality of the input image (e.g. any of images 206-214). The inference is also referred to as the indication of quality. In some examples, the inference (i.e. indication of quality) can be "excellent" quality, "mediocre" quality, or "poor" quality. While the indication of quality is described as being "excellent" quality, "mediocre" quality, or "poor" quality, in other examples any other category name (i.e. category name other than excellent, mediocre, or poor; such as fantastic, so-so, or bad, respectively; or the like) can be used. Further, while three categories of quality are described, in some implementations, the number of categories may be any other number that is two or more.

The content distribution system 107 can determine, at 612, an aggregate quality 203 of content assets 104 (e.g. all of images 206-214) forming the digital component 106. The aggregate quality 203 of the digital component 106 can be noted as a combination of four "excellent" images and three "mediocre" images, in some examples. In some instances, the aggregate quality 203 of the digital component 106 can be computed as a sum of combined scores of all images 206-214 forming the digital component 106. In some cases, the aggregate quality 203 of the digital component 106 can be calculated as a ratio of combined scores of all images 206-214 to a total possible score for all images 206-214 (as shown in FIG. 2A, where the total possible score for all images 206-214 is 10).

The content distribution system 107 can transmit data indicating the aggregate quality 203 of the set 202 to the content provider 108. Such transmission can update a graphical user interface of the content provider 108 to display the inference (i.e. indication 203) of the quality of the set 202 of new one or more images.

Figure 7:
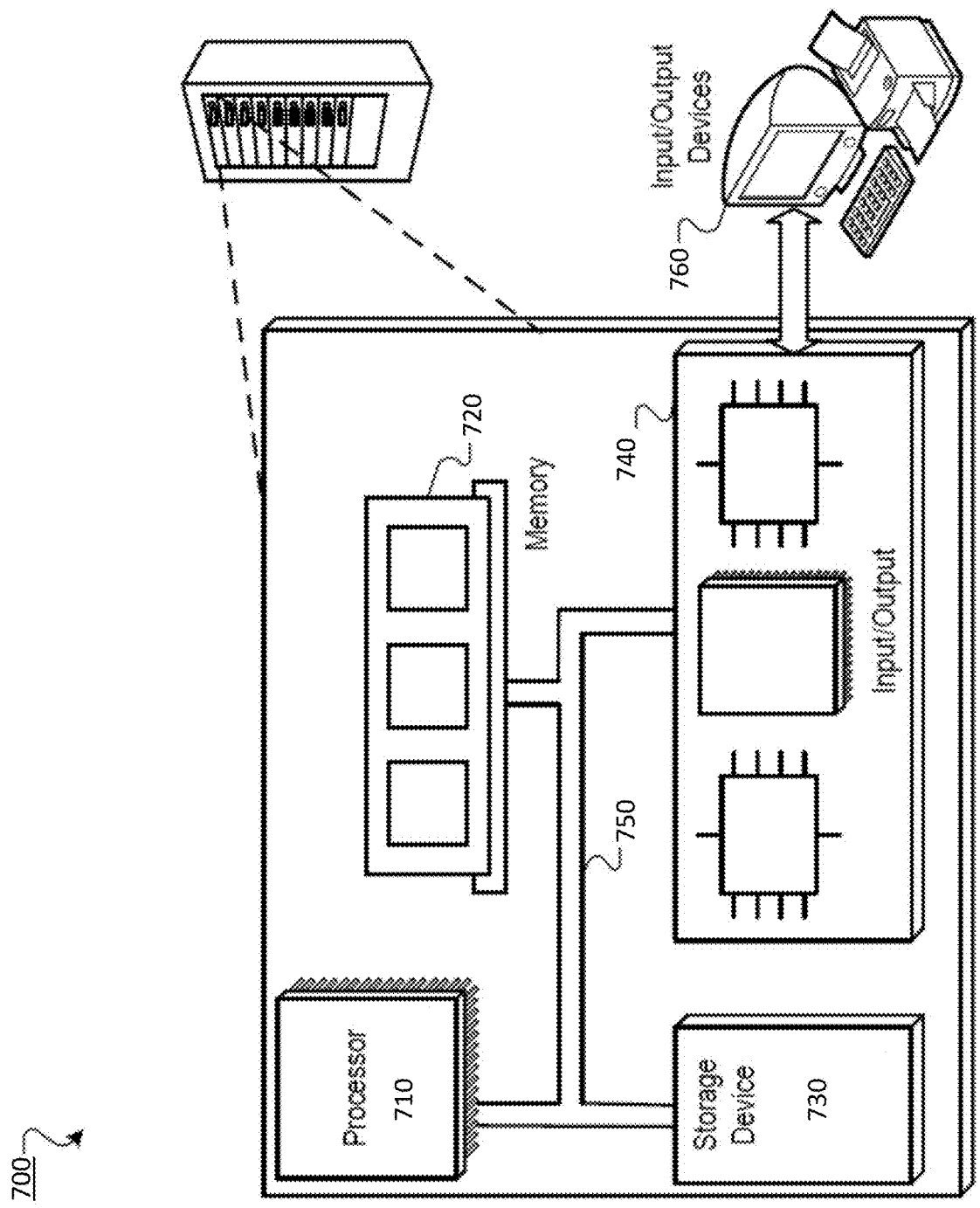
FIG. 7 is block diagram of an example computer system that can be used to perform operations described above.

FIG. 7 is block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores data within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In one implementation, the input/output device 740 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and transmit output data to other input/output devices, e.g., keyboard, printer and display devices 760. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal—e.g., a machine-generated electrical, optical, or electromagnetic signal—that is generated to encode data for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by transmitting documents to and receiving documents from a device that is used by the user; for example, by transmitting web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the online interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   training, by a content distribution system comprising one or more processors, a plurality of machine learning models on a plurality of images, each image being assigned scores indicating quality characteristics of the image, each machine learning model being trained to score an image for a respective quality characteristic;
   receiving, by the content distribution system from a computing device, a request to evaluate image quality of an image included in a current version of a digital component generated by the computing device, wherein the digital component includes the image and at least one other content asset that differs from the image;

deploying, by the content distribution system, the plurality of machine learning models on the image to generate multiple scores including a score for each quality characteristic;

assigning, by the content distribution system, a weight to each score among the multiple scores to generate weighted scores;

combining, by the content distribution system, the weighted scores to generate a combined quality score of the image; and combining the combined quality score of the image with a quality score of the at least one other content asset included in a visual presentation of the digital component to generate an aggregate quality of the digital component that visually presents the image and the at least one other content asset that differs from the image.

2. The method of claim 1, wherein:
the plurality of machine learning models comprise two or more of a blurriness model, an objectionable content model, or an orientation model;
the blurriness model generates a blurriness score quantifying blurriness within the image;
the objectionable content model generates a objectionable content score quantifying objectionable content within the image; and
the orientation model generates an orientation score indicating an orientation of the image.

3. The method of claim 1, wherein the one or more machine learning models comprise a neural network model comprising a plurality of nodes and a plurality of layers, wherein at least one of a number of the nodes or a number of the layers is varied as the training of the neural network progresses so as to experimentally determine an ideal number of at least one of the nodes or the layers.

4. The method of claim 1, further comprising:
aggregating, by the content distribution system, the combined score with other combined scores of other images in the digital component to generate an aggregate score for the digital component; and
updating, by the one or more processors, a graphical user interface of a first computing device to present the aggregate score.

5. The method of claim 4, further comprising:
receiving, by the one or more processors, a modification of the image;
evaluating, by the one or more processors, the combined score for the modified image;
modifying, by the one or more processors, the aggregate score based on the combined score; and
updating, by the one or more processors, the graphical user interface of the first computing device to present the modified aggregate score.

6. The method of claim 4, further comprising:
comparing, by the content distribution system, the aggregate score with preset quality heuristics;
determining, by the content distribution system, that the aggregate score does not comply with the preset quality heuristics;
generating, by the content distribution system in response to determining that the aggregate quality does not comply with the preset quality heuristics, one or more recommendations for improving the aggregate score; and updating, by the one or more processors, the graphical user interface of the first computing device to present the one or more recommendations.

7. The method of claim 4, further comprising:
comparing, by the content distribution system, the aggregate score with a threshold value;
determining, by the content distribution system, that the aggregate score is less than the threshold value; and
preventing, by the content distribution system in response to the determining that the aggregate score is less than the threshold value, distribution of the digital component to one or more client devices.

8. A system comprising:
a memory storing computer executable instructions; and
one or more computers configured to execute the instructions, wherein execution of the instructions cause the one or more computers to perform operations comprising:
training a plurality of machine learning models on a plurality of images, each image being assigned scores indicating quality characteristics of the image, each machine learning model being trained to score an image for a respective quality characteristic;
receiving, from a computing device, a request to evaluate image quality of an image included in a current version of a digital component generated by the computing device, wherein the digital component includes the image and at least one other content asset that differs from the image;
deploying the plurality of machine learning models on the image to generate multiple scores including a score for each quality characteristic;
assigning a weight to each score among the multiple scores to generate weighted scores;
combining the weighted scores to generate a combined quality score of the image;
combining the combined quality score of the image with a quality score of the at least one other content asset included in a visual presentation of the digital component to generate an aggregate quality of the digital component that visually presents the image and the at least one other content asset that differs from the image.

9. The system of claim 8, wherein:
the plurality of machine learning models comprise two or more of a blurriness model, an objectionable content model, or an orientation model;
the blurriness model generates a blurriness score quantifying blurriness within the image;
the objectionable content model generates a objectionable content score quantifying objectionable content within the image; and
the orientation model generates an orientation score indicating an orientation of the image.

10. The system of claim 8, wherein the one or more machine learning models comprise a neural network model comprising a plurality of nodes and a plurality of layers, wherein at least one of a number of the nodes or a number of the layers is varied as the training of the neural network progresses so as to experimentally determine an ideal number of at least one of the nodes or the layers.

11. The system of claim 8, wherein the instructions cause the one or more computers to perform operations further comprising:

aggregating the combined score with other combined scores of other images in the digital component to generate an aggregate score for the digital component; and updating a graphical user interface of a first computing device to present the aggregate score.

12. The system of claim 11, wherein the instructions cause the one or more computers to perform operations further comprising:

receiving a modification of the image;

evaluating the combined score for the modified image;

modifying the aggregate score based on the combined score; and updating the graphical user interface of the first computing device to present the modified aggregate score.

13. The system of claim 11, wherein the instructions cause the one or more computers to perform operations further comprising:

comparing the aggregate score with preset quality heuristics;

determining that the aggregate score does not comply with the preset quality heuristics;

generating, in response to determining that the aggregate quality does not comply with the preset quality heuristics, one or more recommendations for improving the aggregate score; and updating the graphical user interface of the first computing device to present the one or more recommendations.

14. A non-transitory computer readable medium storing instructions, that when executed by one or more computers, cause the one or more computers to perform operations comprising:

training a plurality of machine learning models on a plurality of images, each image being assigned scores indicating quality characteristics of the image, each machine learning model being trained to score an image for a respective quality characteristic;

receiving, from a computing device, a request to evaluate image quality of an image included in a current version of a digital component generated by the computing device, wherein the digital component includes the image and at least one other content asset that differs from the image;

deploying the plurality of machine learning models on the image to generate multiple scores including a score for each quality characteristic;

assigning a weight to each score among the multiple scores to generate weighted scores;

combining the weighted scores to generate a combined quality score of the image;

combining the combined quality score of the image with a quality score of the at least one other content asset included in a visual presentation of the digital component to generate an aggregate quality of the digital component that visually presents the image and the at least one other content asset that differs from the image.

15. The non-transitory computer readable medium of claim 14, wherein:

the plurality of machine learning models comprise two or more of a blurriness model, an objectionable content model, or an orientation model;

the blurriness model generates a blurriness score quantifying blurriness within the image;

the objectionable content model generates a objectionable content score quantifying objectionable content within the image; and the orientation model generates an orientation score indicating an orientation of the image.

16. The non-transitory computer readable medium of claim 14, wherein the one or more machine learning models comprise a neural network model comprising a plurality of nodes and a plurality of layers, wherein at least one of a number of the nodes or a number of the layers is varied as the training of the neural network progresses so as to experimentally determine an ideal number of at least one of the nodes or the layers.

17. The non-transitory computer readable medium of claim 14, wherein the instructions cause the one or more computers to perform operations further comprising:

aggregating the combined score with other combined scores of other images in the digital component to generate an aggregate score for the digital component; and updating a graphical user interface of a first computing device to present the aggregate score.

18. The non-transitory computer readable medium of claim 17, wherein the instructions cause the one or more computers to perform operations further comprising:

receiving a modification of the image;

evaluating the combined score for the modified image;

modifying the aggregate score based on the combined score; and updating the graphical user interface of the first computing device to present the modified aggregate score.

19. The non-transitory computer readable medium of claim 17, wherein the instructions cause the one or more computers to perform operations further comprising:

comparing the aggregate score with preset quality heuristics;

determining that the aggregate score does not comply with the preset quality heuristics;

generating in response to determining that the aggregate quality does not comply with the preset quality heuristics, one or more recommendations for improving the aggregate score; and updating the graphical user interface of the first computing device to present the one or more recommendations.

20. The non-transitory computer readable medium of claim 17, wherein the instructions cause the one or more computers to perform operations further comprising:

comparing the aggregate score with a threshold value;

determining that the aggregate score is less than the threshold value; and preventing, in response to the determining that the aggregate score is less than the threshold value, distribution of the digital component to one or more client devices.

* * * * *